March 16, 1971   J. O. SMITH ET AL   3,570,260
HEAT PUMP

Original Filed Oct. 29, 1964   2 Sheets-Sheet 1

Inventors
Bernard A. Gruber
John O. Smith
By their Attorney

United States Patent Office 3,570,260
Patented Mar. 16, 1971

3,570,260
HEAT PUMP
John O. Smith, Swampscott, and Bernard A. Gruber, Boxford, Mass., assignors to Monsanto Research Corporation, St. Louis, Mo.
Continuation of application Ser. No. 407,442, Oct. 29, 1964. This application Oct. 30, 1967, Ser. No. 679,258
Int. Cl. F25d 5/00; H01m 27/14
U.S. Cl. 62—4                                                                 6 Claims

ABSTRACT OF THE DISCLOSURE

A system and method for transferring heat between an enclosure and an exterior heat sink. The method involves operating a fuel cell within an enclosure to be cooled, on a fuel selected from hydrogen or hydrazine and an oxidant selected from nitric acid or nitrogen tetroxide and expending the electrical output of the cell in driving an electrical resistance located in an exterior heat sink.

---

This application is a continuation of U.S. patent application Ser. No. 407,442 filed Oct. 29, 1964 and now abandoned in favor of the present application.

This invention relates to heat transfer, and more particularly, provides a novel system and method for the transfer of heat from an enclosure to an exterior heat sink.

The invention described herein was made in the performance of work under a NASA contract and is subjected to the provisions of section 305 of the National Aeronautics and Space Act of 1958, Public Law 85-568 (72 Stat. 435; 42 USC 2457).

Heat transfer from an enclosed space to an exterior heat sink can be accomplished without direct contact between the enclosure and the exterior, by use of a circulating liquid heat transfer medium. The liquid is circulated, within pipes, from the interior of the enclosure to an outside radiator, where it loses heat to the heat sink, is cooled and returns to the interior. To facilitate rapid transfer of heat from the liquid to the outside heat sink, the surface area of the liquid in the radiator exposed to the heat sink must be made large. When the radiator surface area is large, if the radiator is of heavy construction, its weight is high; furthermore, thick radiator walls may impede heat transfer from the liquid to the heat sink.

For certain uses, a cooling system involving a radiator of heavy construction is objectionable, and yet a flimsy construction cannot be tolerated. For example, this is true of vehicles travelling in areas where fast-moving objects may be present, such as space vehicles which may be struck by meteorites, military tanks which may be struck by bullets, and so forth. Rapidly moving objects will penetrate radiators of light construction, resulting in possible loss of the heat transfer fluid. The driving engines of vehicles to be cooled must supply extra propulsive power to compensate for the weight of a heavier radiator. When outer space is the exterior heat sink, moreover, the heat transfer fluid is exposed to cosmic radiation, which may degrade the fluid.

It is an object of this invention to provide a novel heat transfer system and method.

A particular object of this invention is to provide a novel system and method for effecting heat transfer from an enclosure to an exterior heat sink without using a heat transfer fluid or a large radiator.

These and other objects will become evident upon consideration of the following specification and claims.

It has now been found that heat transfer between an enclosure and an exterior heat sink can be effected advantageously by:

(1) Operating a fuel cell, within an enclosure to be cooled, on a fuel selected from the class consisting of hydrogen and hydrazine, and an oxidizer selected from the class consisting of nitric acid and nitrogen tetroxide; and (2) Expending the electrical output of the said fuel cell in driving an electrical resistance located in a heat sink outside said enclosure.

The electrochemical reactions of many, and indeed, most fuel and oxidant combinations used to operate fuel cells are exothermic. For example, this is true of the combination of hydrogen as fuel and oxygen as oxidant. Thermodynamic calculations show that the evolution of heat is inherent in the process: for the reaction

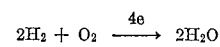

$$2H_2 + O_2 \xrightarrow{4e} 2H_2O$$

(water removed as vapor) carried out at 25° C. and 1 atmosphere, $T\Delta S$ is $-6.32$ kcal./4 equivalents. It has now been discovered, however, that when the fuel is hydrogen or hydrazine and the oxidant is nitric acid or nitrogen tetroxide, the electrochemical reaction is endothermic. For example, for the electrochemical reaction of hydrogen with nitrogen tetroxide. $T\Delta S = +16.6$ kcal./4 equivalents, under the same conditions. The reaction taking place is

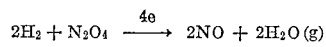

$$2H_2 + N_2O_4 \xrightarrow{4e} 2NO + 2H_2O(g)$$

For this reaction, $\Delta F = 91.3$ kcal./4 equivalents, so that the heat absorption factor amounts to 18% of the power outut. For the electrochemical reaction

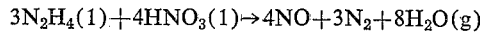

$$3N_2H_4(l) + 4HNO_3(l) \rightarrow 4NO + 3N_2 + 8H_2O(g)$$

$T\Delta S$ is $+46$ kcal./4 equivalents. Similar values of $T\Delta S$ are obtained for the reactions of hydrogen with nitric acid, and hydrazine with nitrogen tetroxide. Thus, cells operating on combinations of these fuels and oxidants will absorb heat from the surrounding space. Thus, if such a cell is operated within an enclosed space, and its electrical output is expended without producing heat within the enclosure, the effect of its operation will be to cool the space in which it is operated.

When an electrical current is passed through an electrical resistance, electricity is converted into heat. The resistance can radiate this heat and thus dissipate it into a heat sink. Accordingly, when the electrical output of a fuel cell of the stated nature operating within an enclosure is sent through a resistance located in an exterior heat sink, heat will be removed from the enclosure and dissipated in the heat sink.

The electrical resistance used for this purpose can be solid and compact. It may be a bar of metal, for example. It will thus be resistant to damage if it should be struck by a moving object, and it will be small and light in relation to the size of the enclosure, so that its weight will not significantly add to the total weight of the enclosure. Further in contrast to systems using a liquid coolant and a radiator therefor, the stated system of the present invention obviates the need for liquid pumps in the system, and when the present system is used in a space vehicle, it obviates the problem of radiation damage to coolant. Also, the present cooling system can be used if desired to supply emergency power.

This invention will be more readily understood from a consideration of the drawings, in which FIG. 1 is an exploded perspective view of the electrodes and electrolyte of a single fuel cell;

Figure 4:
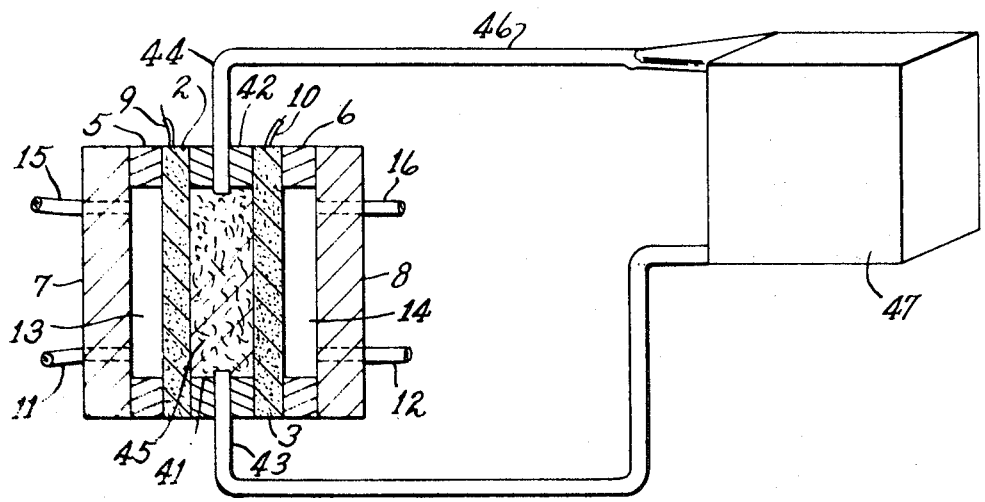

And FIG. 4 is a cross-sectional view of a single fuel cell.

References herein to a "fuel cell" are intended to encompass a single fuel cell or a battery of cells, except where otherwise specified. Usually the fuel cell electrodes and electrolyte are thin flat sheets placed face to face, forming a relatively thin and flat assembly, and these assemblies are usually connected, in series or in parallel, to form a battery of cells.

By an exterior heat sink is meant the atmosphere or space outside an enclosure. As noted hereinabove, the enclosures particularly contemplated herein are vehicles, travelling either in the atmosphere or in outer space. Ordinarily, the temperature outside the enclosure will be lower than that inside; in any case, it will be lower than that of the resistance during operation of the cell, and the space outside will be sufficiently large so that the heat radiated into it by the resistance will not appreciably change its temperature.

The heat transfer system and method of this invention is not limited to any particular cell construction. The chief variables in fuel cell construction are the electrodes (cathode and anode) and the electrolyte. It is essential for fuel cell operation that simultaneous contact be obtained between the feedstock fed to an electrode, the electrode and the electrolyte. The feedstock may be supplied to the electrolyte as a gas or as a liquid (inherently, or in solution). The electrodes may be porous, and the feedstocks pass through them to reach the electrolyte. It is frequently desirable to have a catalyst material such as platinum at the electrode surface contacting the electrolyte; the electrode itself may be made of a metal like nickel or of carbon, for example. The electrolyte may be a liquid such as a conductive aqueous solution of an ionizable acid, salt or base, such as KOH for example, or it may be a solid sheet of an ion-exchanging material such as an anion or cation exchange resin membrane. Details of suitable cell construction features for utilization of the presently useful feedstocks are known in the art.

In an illustrative embodiment of the invention, for example, the fuel feedstock is 1 M $N_2H_4$ in 5 M $H_3PO_4$. The anode is a 100 mesh stainless steel disk plated with Pt, 1.8 cm.$^2$. The oxidant feedstock is $N_2O_4$ vapor. The cathode is a porous carbon disk (2.5 cm.$^2$), which abuts on an electrolyte chamber containing 5 M $H_3PO_4$. A cation exchange resin membrane is positioned between the other side of the electrolyte chamber and the anode.

Figure 1:
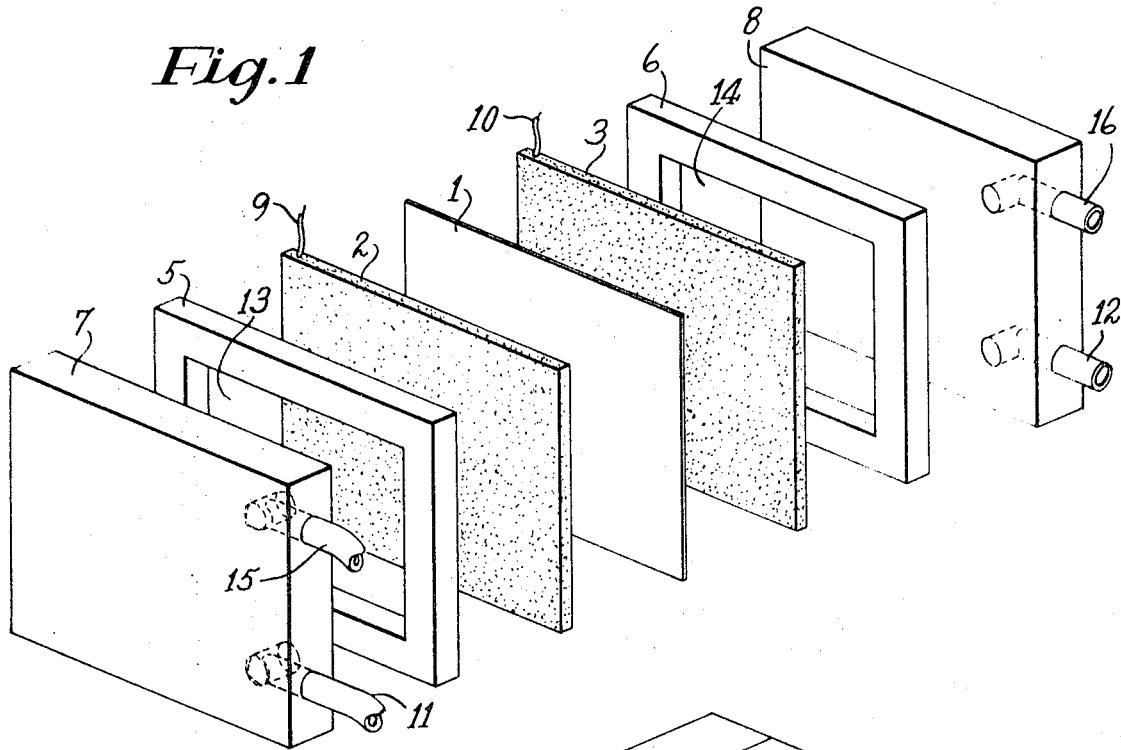

In the drawings illustrative of the invention, FIG. 1 is an exploded perspective view of a single fuel cell in which 1 is an ion exchange membrane, 2 and 3 are porous electrodes, 5 and 6 are gaskets acting as spacers, and 7 and 8 are end plates. Electrical leads 9 and 10 are attached to porous electrodes 2 and 3, connecting them to an external electrical circuit (not shown), and feedstock valved inlets 11 and 12 permit introduction of feedstock to the chambers 13 and 14 formed respectively by the juxtaposition of end plate 7, spacer 5 and electrode 2, and of end plate 8, spacer 6 and electrode 3. Outlets 15 and 16 permit outflow from chambers 13 and 14. The feedstocks pass through porous electrodes 2 and 3 to contact the ion exchange membrane 1, and the electrochemical reactions of the fuel and oxidant feedstocks respectively take place at the interfaces of the ion exchange membrane 1 and the electrodes 2 and 3, generating electricity which is withdrawn and conducted through a resistance (not shown) connected to leads 9 and 10.

As will be evident from FIG. 1, a single (assembled) fuel cell may have the shape of a rectangular parallelepiped, with two dimensions generally much greater than the third.

Figure 2:
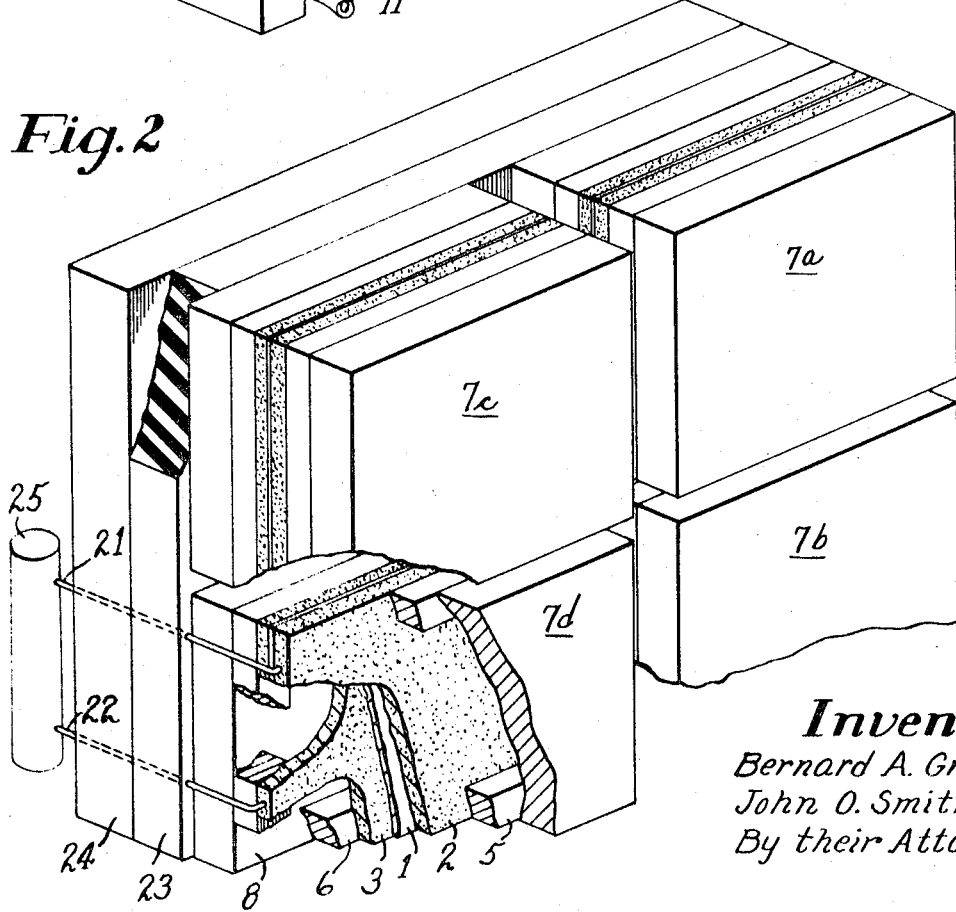
FIG. 2 is a plan view partly in section, of a heat transfer system comprising a wall in which single fuel cells are mounted like tiles.

FIG. 2 is a perspective view of a heat transfer system, partially in section. Single fuel cells having a configuration as stated above are mounted like tiles on a wall. The portions visible in plan view on the wall, are the cells' end plates, 7a, 7b, 7c, 7d. The wall is partially broken away to show one cell in section, exhibiting spacer gaskets 5 and 6, porous electrodes 2 and 3, ion exchange membrane 1, and an end plate 8. In this view, the inlet and outlet valves to each cell are not visible; they may be arranged so that the outflow of one cell chamber is connected to the inlet of an adjacent chamber, whereby the feedstock travels from cell to cell. The electrical leads to the electrodes of each separate cell may be joined from cell to cell to connect the cells in series or in parallel.

Take-off leads 21 and 22 collect the total electrical output of the battery of cells, and conduct it through an insulating layer 23, of glass fiber or the like, between the cells and the outer side of the wall in which the cells are mounted. These leads pass through the outer side 24 of the wall, where they are connected to an electrical resistance 25, which is a bar of tungsten or the like.

End plates 7a, 7b, 7c, 7d at the wall surface are in heat-exchanging relationship with the atmosphere contacting that surface of the wall, which will be the atmosphere in the interior of an enclosure to be cooled. When the cells are operated on fuel and oxidant combinations as presently contemplated, the endothermic nature of the electrochemical reaction will cause the temperature within the cells to drop and consequently, heat will be absorbed from the enclosure by the cells through the endplates 7a, 7b, 7c, 7d. The electricity produced by the cells will be conducted through take-off leads 21 and 22 to the resistance 25, which is located outside the enclosure wall, in a heat sink. Passage of electricity from the cells through the resistance will cause the resistance to radiate heat into the heat sink, thus transferring the heat absorbed by the cells from the enclosure to the heat sink.

Figure 3:
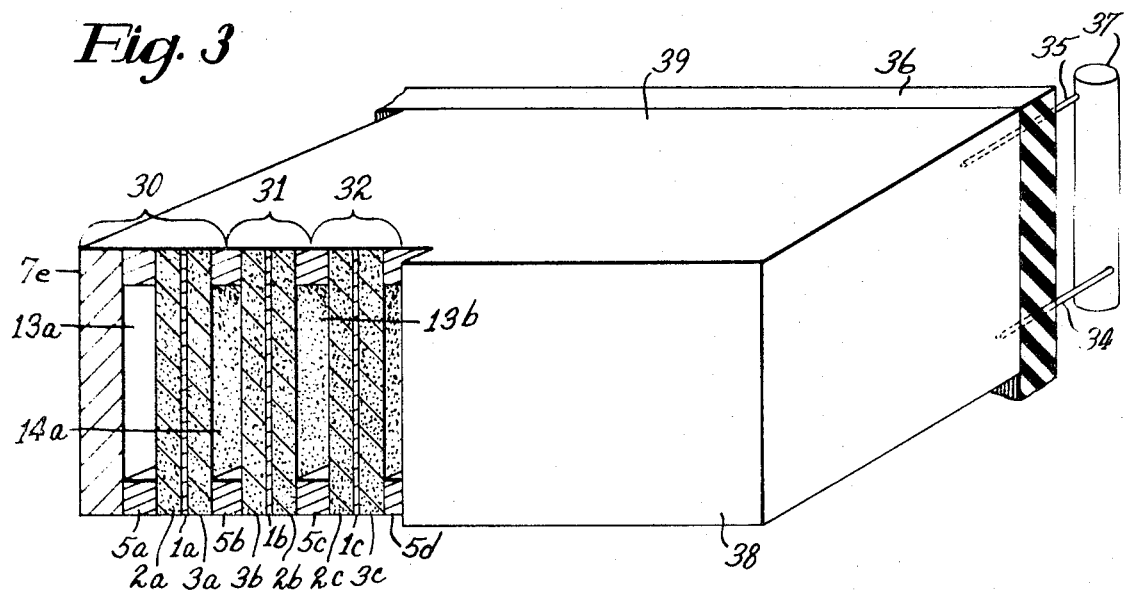
FIG. 3 is a perspective view, partly in section, of an edge-cooled fuel cell heat transfer system.

FIG. 3 illustrates another embodiment of the present invention, employing a stacked battery of cells. This figure is a perspective view, partly in section, of an edge-cooled fuel cell heat transfer system. A number of cells 30, 31, 32 and so forth are stacked so as to share common feedstock chambers between adjacent cells. Next to the end plate 7e of cell 30, chamber 13a formed within spacer gasket 5a feeds through porous electrode 2a, to electrolyte 1a. From chamber 14a within gasket 5b, feedstock feeds both through porous electrode 3a to electrolyte 1a and through porous electrode 3b to electrolyte 1b, supplying cells 30 and 31. Completing cell 31 and beginning cell 32, feedstock in chamber 13b within gasket 5c feeds through porous electrode 2b to electrolyte 1b of cell 31, and through porous electrode 2c to electrolyte 1c of cell 32. In cell 32, the back face of electrolyte 1c is next to porous electrode 3c which is fed from the feed-stock chamber within gasket 5d and so forth. Electrodes 2a, 2b and 2c are of the same polarity (all anodes or all cathodes) and electrodes 3a, 3b and 3c are all of the same polarity, which is opposite to that of electrodes 2a, 2b and 2c: for example, electrodes 2a, 2b and 2c may each be cathodes, and electrodes 3a, 3b and 3c, each anodes. The cell feedstock inlets and outlets (not shown) may be appropriately connected to route fuel and oxidant feedstocks from one chamber to another, with each feedstock supplying every alternate chamber, as will be appreciated on consideration of the above-described structure. Also, the cells will be electrically connected, in series or parallel, by leads from each electrode (not shown). The electrical output of the entire battery is collected by appropriately connected take-off leads 34 and 35 which pass through insulated wall 36 to connect to an electrical resistance 37.

The operation of the battery heat transfer system of FIG. 3 is like that of the battery heat transfer system of FIG. 2. Operation of the fuel cell battery is endothermic, whereby the battery absorbs heat from the surrounding atmosphere, and its electrical output is expended through the resistance radiating heat into a heat sink. The battery is located within an enclosure to be cooled, and the heat-radiating resistance connected to the battery is positioned outside the enclosure, in the heat sink. In the battery illustrated in FIG. 3, cooling of the enclosure occurs by absorption of heat from the enclosure chiefly along the edges (that is, the sides) such as sides 38 and 39 of the battery. Less battery surface is exposed to the enclosure than with the arrangement of FIG. 3, but there is more direct access of the atmosphere in the enclosure to the electrochemical reaction site, at the electrolyte-electrode interfaces, in the arrangement of FIG. 3.

FIG. 4 is a cross-sectional view of a fuel cell in which 2 and 3 are porous electrodes, 5 and 6 are spacer gaskets forming with electrodes 2 and 3, and with end plates 7 and 8, respectively, chambers 13 and 14 for containing feedstocks. The feedstocks have access to chambers 13 and 14, through inlets 11 and 12, while outlets 15 and 16 permit outflow of the contents of chambers 13 and 14. Electrical leads 9 and 10 connect electrodes 2 and 3 to an external circuit (not shown). A central electrolyte chamber 41 is formed in this cell by the juxtaposition of electrodes 2 and 3 with spacer gasket 42, which is penetrated by an inlet 43 and an outlet 44. The chamber 41 may be filled with an absorbent such as loosely matted fibers of glass 45. Liquid electrolyte flows into electrolyte chamber 41, through inlet 43, reacts electrochemically with the feedstocks at electrodes 2 and 3, and then exits from the chambers through outlet 44, flows through a conduit 46, and reaches equipment to be cooled 47, where the conduit 46 widens and flattens to present maximum surface area to equipment 47, in order to facilitate heat transfer from equipment 47 to the electrolyte in the conduit. The conduit carrying the electrolyte then returns to the cell, which the electrolyte enters through inlet 43, and the heat is absorbed from the electrolyte by the cell through the endohermic electrochemical reaction. Leads 9 and 10 conduct the electrical output of the cell to a resistance (not shown) in a heat sink outside the enclosure which is the location of the cell, conduit 46 and equipment 47. The resistance radiates heat into the heat sink, completing the heat transfer system.

The temperature maintained within the enclosure in operation of the present heat transfer system will be one suitable for the operation of equipment within the enclosures. For example, this may be 75–90° F. The temperature reached by the resistance in the heat sink will desirably be as high as consistent with avoiding volatilization or melting of the resistance materials. For example, with a resistance made of tungsten, which has a low volatility and high melting point, temperatures of 2000–3000° C. may be reached.

The endothermic properties of the fuel cell systems of this invention may, if desired, be increased by combining the present heat transfer system with a reforming system for the production of hydrogen to be used as fuel in the cell. For example, methanol, propane or mono- or dimethylhydrazine may be catalytically reformed with water in the vapor phase to produce mixtures of hydrogen with carbon dioxide. The reformate may be supplied to a fuel cell electrode as such, or may be treated to pass the hydrogen selectively, as by diffusion through a palladium-silver alloy membrane, through to the fuel cell. The use of reforming to provide hydrogen feedstock for fuel cell use, including the conservation of heat in the process, is well known and form a part of this invention only insofar as combined with the present heat transfer system including an electrical resistance which dissipates the cell electrical output to a heat sink.

As will be appreciated by those skilled in the art, various other auxiliary equipment may be employed with apparatus as described above. Thus, means may be provided for regulating the resistance in circuit with the cells, to provide control of the cooling rate, and so forth.

While the invention has been described with particular reference to specific preferred embodiments thereof, it will be appreciated that modifications and variations can be made without departing from the scope of the invention as disclosed herein, which is limited only as indicated in the following claims.

We claim:

1. A method for removing ambient heat from within an enclosure which comprises the steps of
   (A) operating a fuel cell, within said enclosure on a fuel chosen from the group consisting of hydrogen and hydrazine, and an oxidizer chosen from the group consisting of nitric acid and nitrogen tetroxide whereby the electrochemical reaction of said cell produces electrical energy and absorbs said ambient heat, and
   (B) dissipating substantially all of said electrical energy external to said enclosure to thereby cool said enclosure.

2. The method of claim 1 wherein said fuel is hydrogen.

3. The method of claim 1 wherein said fuel is hydrazine.

4. The method of claim 1 wherein said oxidizer is nitric acid.

5. The method of claim 1 wherein said oxidizer is nitrogen tetraoxide.

6. The method of claim 1 wherein step (B) is achieved by driving an electrical resistance located in a heat sink outside said enclosure.

References Cited

UNITED STATES PATENTS

| | | | |
|---|---|---|---|
| 3,287,167 | 11/1966 | Weiss et al. | 136—86 |
| 3,300,341 | 1/1967 | Gregory et al. | 136—86 |
| 3,321,334 | 5/1967 | Palmer | 136—86 |
| 3,281,274 | 10/1966 | Moerikofer | 136—86 |
| 3,350,227 | 10/1967 | Moerikofer | 136—86 |
| 3,382,103 | 5/1968 | Smith | 136—86 |

FOREIGN PATENTS

| | | | |
|---|---|---|---|
| 1,342,879 | 10/1963 | France | 136—86 |

OTHER REFERENCES

Astia A.D.: 286,686 Third Status Report on Fuel Cells, U.S. Army Signal Research and Development Lab. June 1962.

ALLEN B. CURTIS, Primary Examiner

U.S. Cl. X.R.
62—3; 136—86